United States Patent
Park et al.

(10) Patent No.: US 7,636,385 B2
(45) Date of Patent: Dec. 22, 2009

(54) APPARATUS AND METHOD OF ON-CHANNEL REPEATER

(75) Inventors: Sung-Ik Park, Daejon (KR); Yong-Tae Lee, Daejon (KR); Jae-Hyun Seo, Daejon (KR); Seung-Won Kim, Daejon (KR); Soo-In Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 636 days.

(21) Appl. No.: 10/577,532

(22) PCT Filed: Oct. 29, 2004

(86) PCT No.: PCT/KR2004/002767

§ 371 (c)(1),
(2), (4) Date: Apr. 28, 2006

(87) PCT Pub. No.: WO2005/041571

PCT Pub. Date: May 6, 2005

(65) Prior Publication Data

US 2007/0041434 A1    Feb. 22, 2007

(30) Foreign Application Priority Data

Oct. 29, 2003    (KR) .............................. 2003-0076098

(51) Int. Cl.
*H04B 7/02* (2006.01)

(52) U.S. Cl. ...................................... 375/211

(58) Field of Classification Search ................. 375/211, 375/214, 215; 455/11.1, 13.2
See application file for complete search history.

(56) References Cited

U.S. PATENT DOCUMENTS 6,973,121 B1 *   12/2005   Eberlein et al. ............. 375/211
2001/0005234 A1    6/2001   Choi et al.

FOREIGN PATENT DOCUMENTS

| CN | 1302153 A | 7/2001 |
| KR | 2001 0063823 | 7/2001 |
| KR | 2002 0013157 | 2/2002 |
| KR | 2003 0064374 | 7/2003 |
| WO | 02/11470 A1 | 2/2002 |
| WO | WO 0211470 | 2/2002 |

OTHER PUBLICATIONS

'On-Channel Repeater for Digital Television Broadcasting Service' Salehian et al., IEEE Transactions On Broadcasting, vol. 48, No. 2, Jun. 2002, pp. 97-102.

* cited by examiner

*Primary Examiner*—Kevin Y Kim
(74) *Attorney, Agent, or Firm*—Ladas & Parry LLP (57) ABSTRACT

Provided is an on-channel repeater and method thereof. The on-channel repeating apparatus includes: a receiving unit for receiving a Radio Frequency (RF) broadcast signal; a demodulating unit for converting the RF signal into a baseband signal; an equalizing unit for equalizing the baseband signal to generate an equalized baseband signal; a modulating unit for converting the equalized baseband signal into an RF signal; and a transmitting unit for transmitting the RF signal.

20 Claims, 12 Drawing Sheets

APPARATUS AND METHOD OF ON-CHANNEL REPEATER

TECHNICAL FIELD

The present invention relates to an on-channel repeater and method thereof; and, more particularly, to an on-channel repeater and method thereof, in which a Radio Frequency (Hereinafter, referred to as "RF") broadcast signal transmitted from a main transmitter is converted into a baseband signal. Noise and multi-path signals generated due to a transmission channel between the main transmitter and the on-channel repeater and a feedback signal generated due to low isolation of transmission/reception antennas of the on-channel repeater are removed from the baseband signal by using an equalizer, and the baseband signal is again converted into a RF broadcast signal such that the same output signal as an input signal of the on-channel repeater is repeated over an on-channel.

BACKGROUND ARTS

Generally, to provide a broadcasting service, a main transmitter and a repeater are disposed depending on a peripheral topography and natural feature, and depending on a service area of a broadcasting company. The repeater is installed at an area where a weak broadcast signal is received from the main transmitter, and operates to strengthen the signal and to increase a signal transmission area from the main transmitter.

Figure 1:
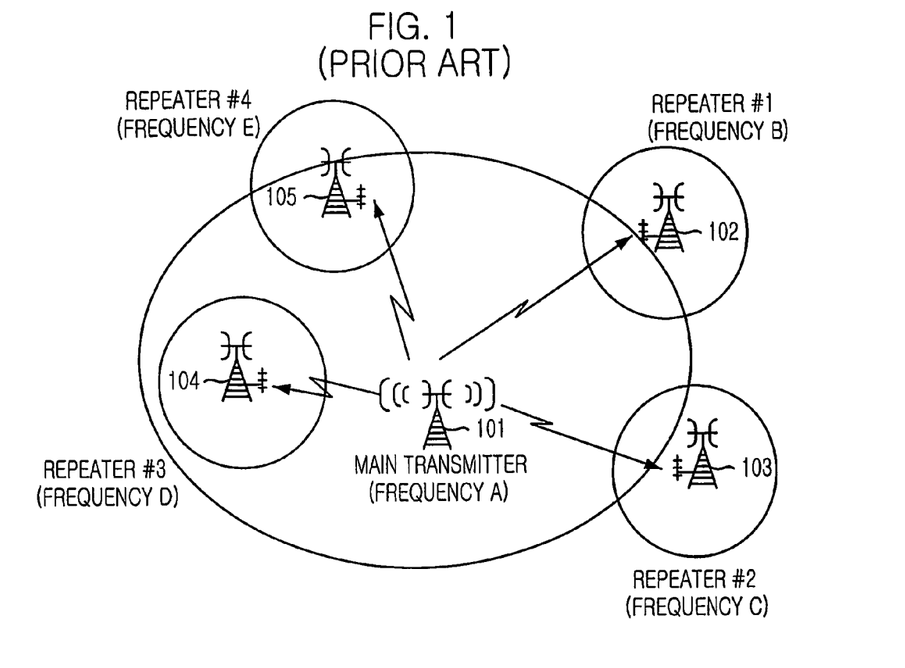
FIG. 1 is a view depicting an example of a broadcasting service using a conventional repeater.

FIG. 1 is a view depicting an example of a broadcasting service using a conventional repeater, and illustrates each repeater using frequencies different from one another.

As shown in FIG. 1, in the broadcasting service using the conventional repeater, first, a main transmitter 101 transmits a broadcast signal using a transmission frequency (A), and each of repeaters 102 to 105 repeats a signal using a different frequency from the transmission frequency (A). However, since the conventional repeater of FIG. 1 assigns a different frequency to each of the repeaters 102 to 105 to solve the weak signal problem for the signal received from the main transmitter 101 or to increase the broadcast zone, the conventional repeater is inefficient in frequency utilization in that each of the repeaters 102 to 105 uses a plurality of frequency bands which in turn utilizes a large amount of frequency resources.

Figure 2:
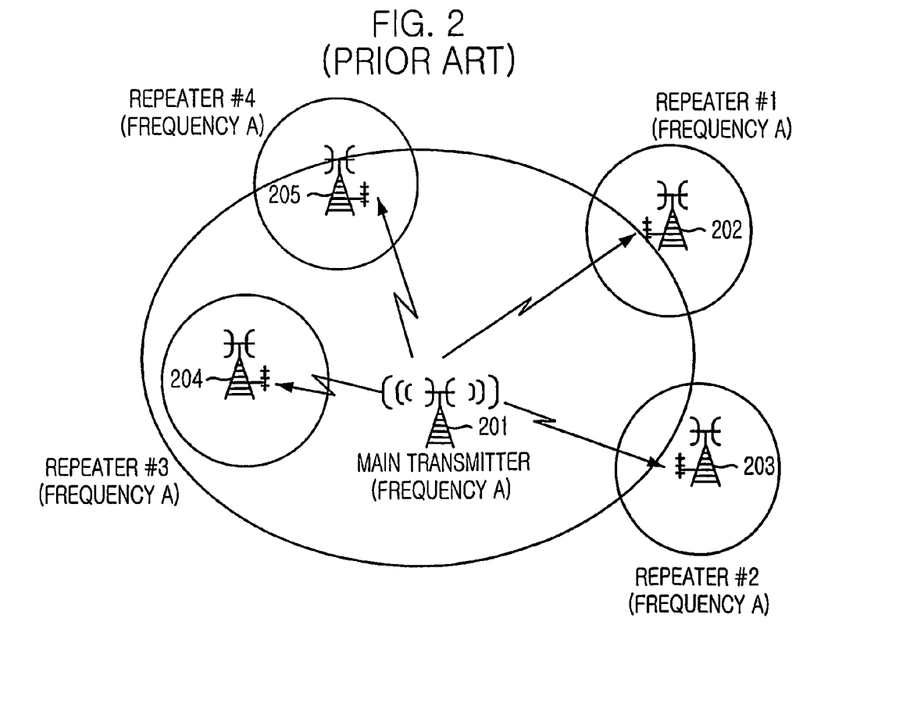
FIG. 2 is a view depicting another example of a broadcasting service using a conventional repeater.

FIG. 2 is a view depicting another example of the broadcasting service using the conventional repeater, and illustrates a conceptual view of the broadcasting service in which the on-channel repeater repeats using the same frequency. In other words, a main transmitter 201 transmits a broadcast signal using a transmission frequency (A), and each of the on-channel repeaters 202 to 205 repeats the broadcast signal using the same frequency as the transmission frequency (A). In order to enable the broadcasting service, a receiver should be able to distinguish from one another the broadcast signals transmitted from the main transmitter 201 and the on-channel repeaters 202 to 205 using the same frequency band.

Generally, a receiver includes an equalizer to eliminate multipath signals and the equalizer also eliminates delayed input signals having an identical frequency.

However, if signals from the main transmitter 201 and the on-channel repeaters 202 to 205 using the same frequency bandwidth are not identical, the signals become noise signals relative to each other. These noise signals cannot be eliminated by the equalizer. Furthermore, if each of signals from the main transmitter 201 and the on-channel repeaters 202 to 205 is delayed as long as a predetermined time that could not be permitted to the equalizer, the equalizer could not eliminate the delayed signal.

Accordingly, in order to provide a digital broadcasting service using the on-channel repeater, it is required as a precondition that the output signal of the on-channel repeater should be the same as the output signal of the main transmitter, and time-delaying of the two output signals should be low.

The following explanation is provided to illustrate the drawbacks occurring when a signal is repeated using the conventional on-channel repeater with reference to FIGS. 3 to 6.

Figure 3:
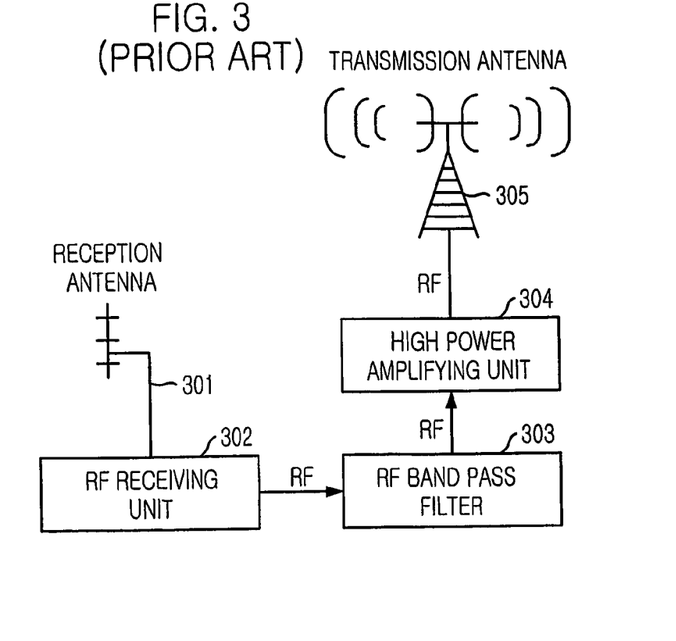
FIG. 3 is an exemplary view illustrating a construction of a conventional RF amplification on-channel repeater.

FIG. 3 is an exemplary view illustrating a construction of a conventional RF amplification on-channel repeater.

As shown in FIG. 3, in the conventional RF amplification on-channel repeater, a RF broadcast signal is received from a main transmitter through a reception antenna 301 and a RF receiving unit 302, the received RF signal passes through a RF band pass filter 303 only at a desired signal band, the band passed RF signal is amplified through a high power amplifying unit 304 and then transmitted through a transmission antenna 305 of the on-channel repeater over an on-channel. The RF amplification on-channel repeater has a characteristic of a low system delay and a simple structure.

Figure 4:
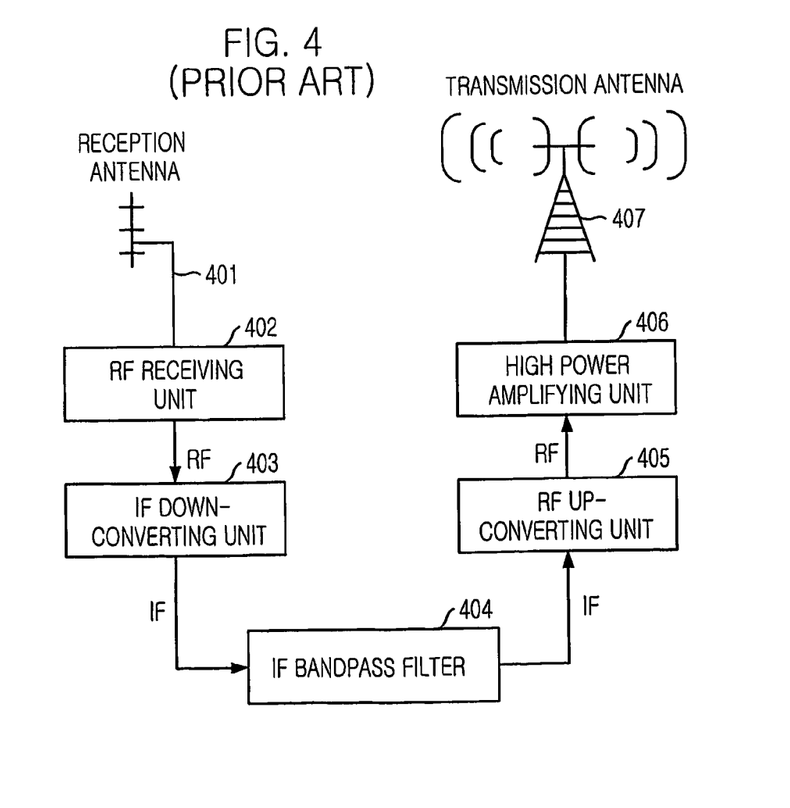
FIG. 4 is an exemplary view, illustrating a construction of a conventional IF conversion on-channel repeater.

FIG. 4 is an exemplary view illustrating a construction of a conventional IF conversion on-channel repeater.

As shown in FIG. 4, in the conventional IF conversion on-channel repeater, a RF broadcast signal is received from a main transmitter through a reception antenna 401 and a RF receiving unit 402. The received RF signal is converted into an IF signal through an IF down-converting unit 403, and the IF signal passes through the IF band pass filter 404 only at a desired signal band. The band passed IF signal is converted into a RF broadcast signal through the RF up-converting unit 405, and the RF broadcast signal is amplified through a high power amplifying unit 406 and then transmitted through a transmission antenna 407. The IF conversion on-channel repeater also has a low system delay and a simple structure. Further, a selection characteristic of the band pass filter is superior to that of the RF amplification on-channel repeater of FIG. 3.

Figure 5:
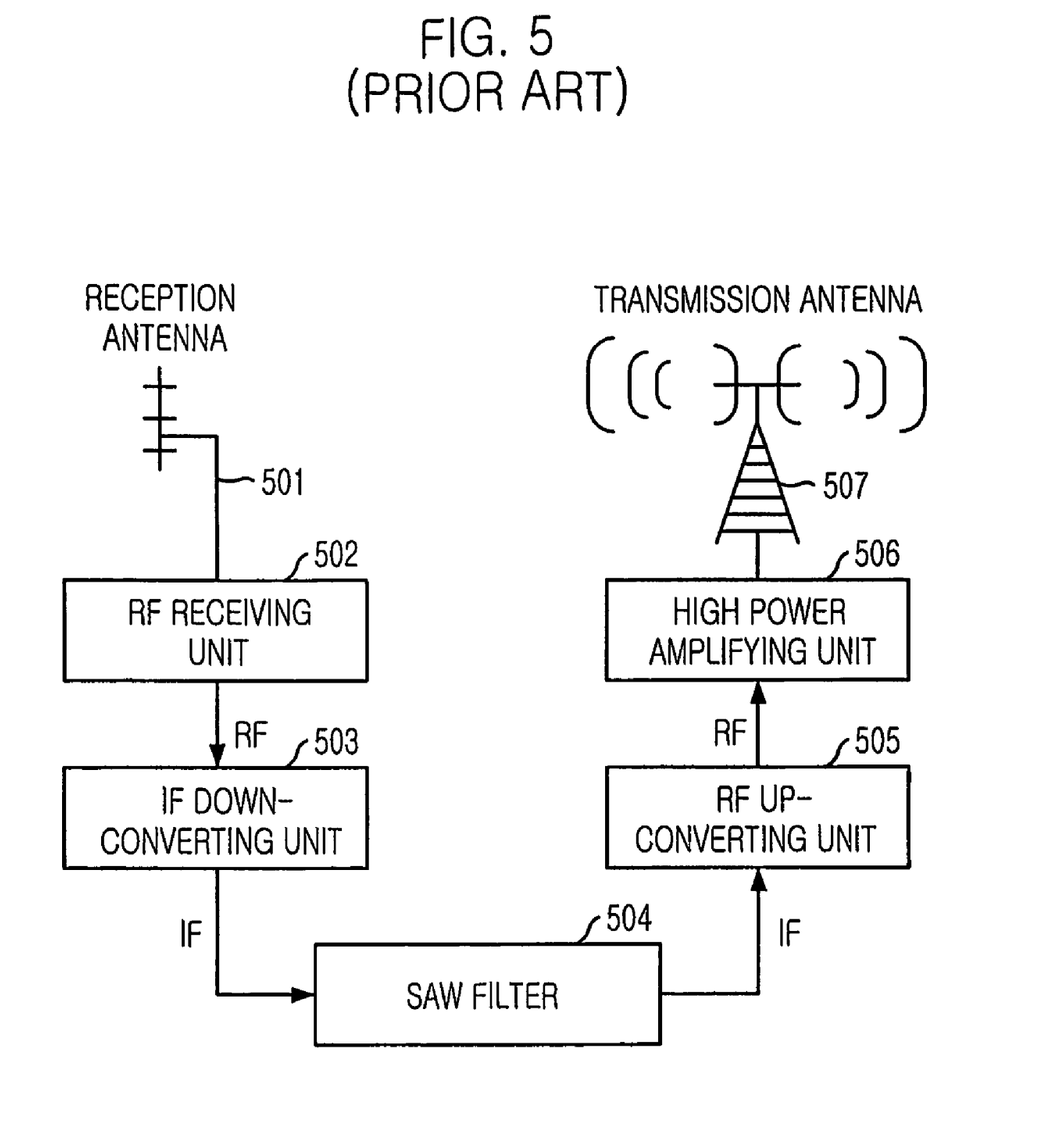
FIG. 5 is an exemplary view illustrating a construction of a conventional SAW filter on-channel repeater.

FIG. 5 is an exemplary view illustrating a construction of a conventional Surface Acoustic Wave (SAW) filter on-channel repeater.

As shown in FIG. 5, in the conventional SAW filter on-channel repeater, a RF broadcast signal is received from a main transmitter through a reception antenna 501 and a RF receiving unit 502, and the received RF broadcast signal is converted into an IF signal through an IF down-converting unit 503. The IF signal passes through an SAW filter 504 only at a desired signal band, and the SAW filtered IF signal is converted into a RF broadcast signal through a RF up-converting unit 505. The RF broad signal is amplified through a high power amplifying unit 506 and then transmitted through a transmission antenna 507. The SAW filter on-channel repeater has also a low system delay and a simple structure. Further, a selection characteristic of the SAW filter is superior to that of the IF conversion on-channel repeater of FIG. 4.

Figure 6:
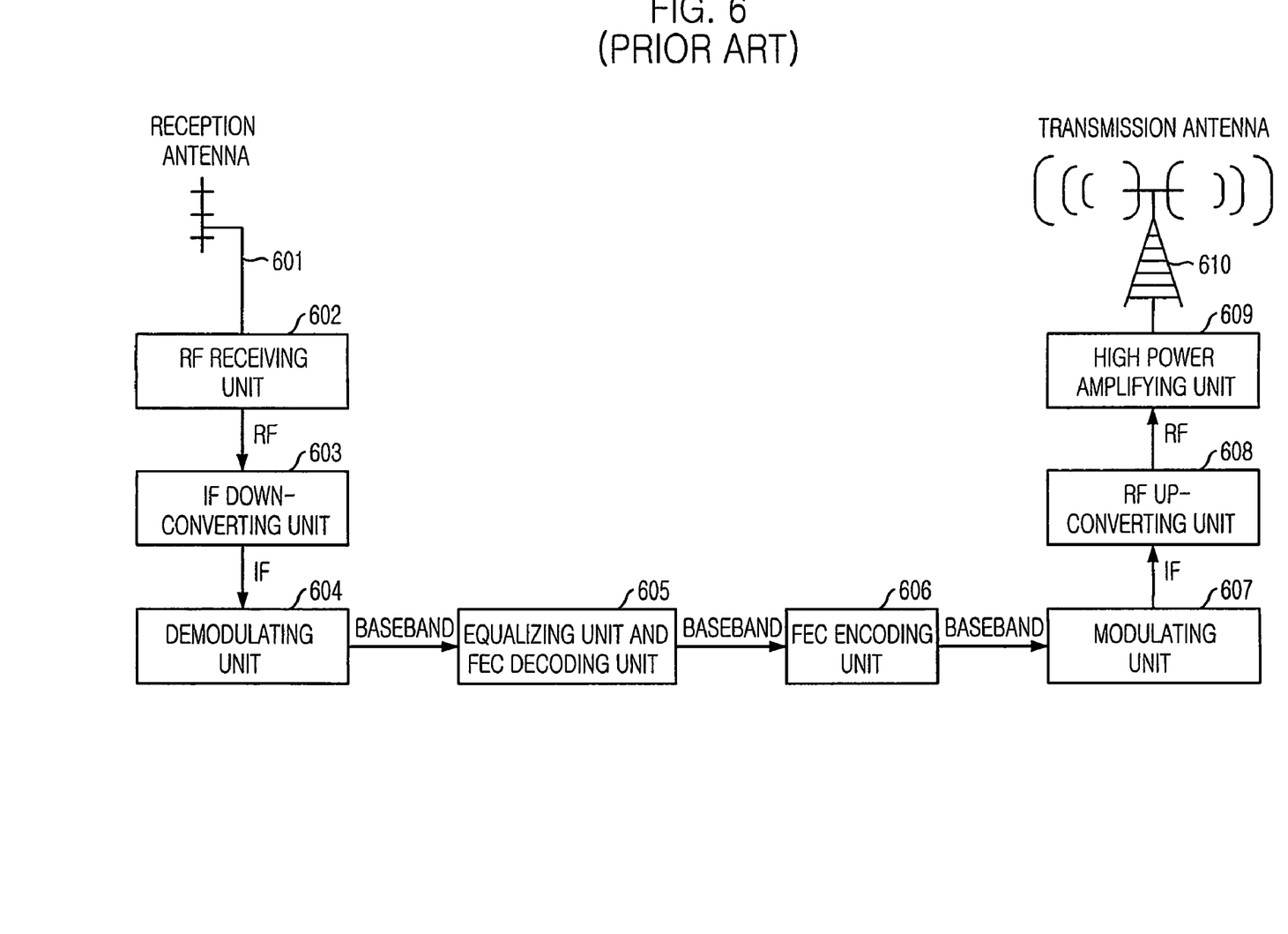
FIG. 6 is an exemplary view illustrating a construction of a conventional demodulation/modulation on-channel repeater.

FIG. 6 is an exemplary view illustrating a construction of a conventional demodulation/modulation on-channel repeater.

As shown in FIG. 6, in the conventional demodulation/modulation on-channel repeater, a RF broadcast signal is received from a main transmitter through a reception antenna 601 and a RF receiving unit 602. The received RF broadcast signal is converted into an IF signal through an IF down-converting unit 603. The IF signal is converted into a baseband signal through a demodulating unit 604. The noise and multi-path signals generated due to the transmission channel between the main transmitter and the on-channel repeater are removed from the converted baseband signal in an equalizer unit and forward error correction (FEC) decoding unit 605. The output signal of the equalizer unit and FEC decoding unit 605 is error-correction encoded through FEC encoding unit 606. The FEC-encoded signal is converted into an IF band broadcasting signal through a modulating unit 607. The converted IF signal is converted into a RF broadcast signal through a RF up-converting unit 608, and the RF broadcast signal is amplified through a high power amplifying unit 609 and then transmitted through a transmission antenna 610.

In the conventional on-channel repeater in FIGS. 3 to 6, the characteristics of the output signals of the on-channel repeaters are inferior to those of the input signals of the on-channel repeaters since the noise and multi-path signals generated due to the transmission channel between the main transmitter and the on-channel repeater, the feedback signal generated due to the low isolation of the transmission/reception antennas, and a system noise added from an on-channel repeater system, etc. cannot be removed. The above mentioned conventional on-channel repeaters shown in FIGS. 3 to 6 have drawbacks in that the transmission power of the on-channel repeater is limited due to the feedback signal generated due to the low isolation of the transmission/reception antennas.

The conventional on-channel repeater having a modulating unit and a demodulating unit in FIG. 6 improves a function of removing a noise on the conventional on-channel repeaters in FIGS. 3 to 5. However, since the conventional demodulation/modulation on-channel repeater in FIG. 6 includes a FEC decoding unit and a FEC encoding unit, the time delay in the on-channel repeater is increased from few microseconds to few milliseconds. Since the output signal generated due to ambiguity of a general standard trellis encoder of FIG. 6 is recognized as a noise, the on-channel repeater does not remove the output signal generated due to ambiguity.

Accordingly, an on-channel repeater is required for solving the above-mentioned drawbacks, that is, for allowing the output signal thereof to be the same as the output signal of the main transmitter, for allowing low time-delaying of the two output signals, for removing the noise and multi-path signals generated due to the transmission channel between the main transmitter and the on-channel repeater so that the on-channel repeater has a. superior characteristic of the output signal to that of the input signal, and for removing the feedback signal generated due to the low isolation of the transmission/reception antennas so that the transmission output power of the on-channel repeater can be increased.

DISCLOSURE OF THE INVENTION

It is, therefore, an object of the present invention to provide an on-channel repeater and method, for repeating the same output signal as an input signal of the on-channel repeater over an on-channel by converting a RF broadcast signal transmitted from a main transmitter into a baseband signal, removing noise and multi-path signals generated due to a transmission channel between the main transmitter and the on-channel repeater and a feedback signal generated due to low isolation of transmission/reception antennas, from the converted baseband signal through a high performance equalizer, and then again converting the baseband signal into a RF broadcast signal.

In accordance with one aspect of the present invention, there is provided an on-channel repeating apparatus for repeating a signal over an on-channel, the on-channel repeating apparatus including: a receiving unit for receiving a Radio Frequency (RF) broadcast signal; a demodulating unit for converting the RF signal into a baseband signal; an equalizing unit for equalizing the baseband signal to generate an equalized baseband signal; a modulating unit for converting the equalized baseband signal into an RF signal; and a transmitting unit for transmitting the RF signal.

In accordance with another aspect of the present invention, there is provided an on-channel repeating method of repeating a signal over an on-channel, the on-channel repeating method including the steps of: a) receiving a Radio Frequency (RF) broadcast signal; b) converting the RF signal into a baseband signal; c) equalizing the baseband signal to generate an equalized baseband signal; d) converting the equalized baseband signal into an RF signal; and e) transmitting the RF signal.

BRIEF DESCRIPTION OF THE DRAWINGS

The above and other objects and features of the present invention will become apparent from the following description of the preferred embodiments given in conjunction with the accompanying drawings, in which.

MODES FOR CARRYING OUT THE INVENTION

Figure 7:
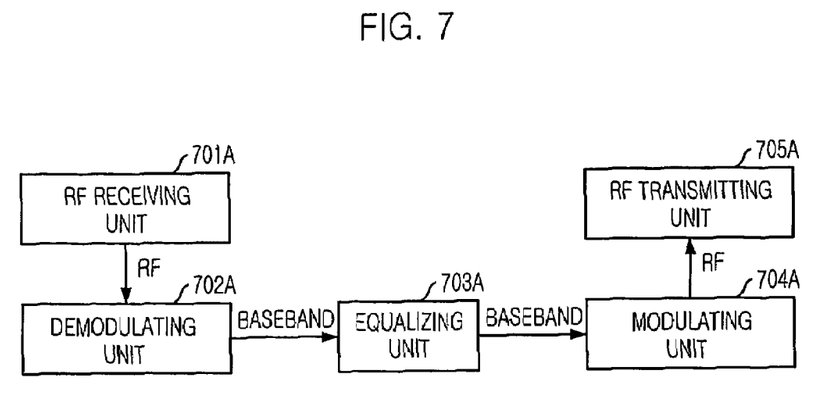
FIG. 7 is a diagram illustrating an on-channel repeater in accordance with a preferred embodiment of the present invention.

FIG. 7 is a diagram illustrating an on-channel repeater in accordance with a preferred embodiment of the present invention.

As shown, the on-channel repeater includes an RF receiving unit 701A for receiving a radio frequency (RF) signal, a demodulating unit 702A for converting the RF signal into a baseband signal, an equalizing unit 703A for compensating distortion of the baseband signal, a modulating unit 704A for converting the signal from the equalizing unit 703A to an RF signal, and an RF transmitting unit 705A for transmitting the RF signal.

Hereinafter, the on-channel repeater will be described in detail.

The RF receiving unit 701A receives a radio frequency (RF) signal from a main transmitter. The demodulating unit 702A converts the RF signal into a baseband signal. The equalizing unit 703A removes noise and multi-path signals generated between the main transmitter and the on-channel repeater and a feedback signal from the converted baseband signal. The modulating unit 704A converts the baseband signal outputted from the equalizing unit 703A into an RF signal. The RF transmitting unit 705A transmits the RF signal.

Figure 12:
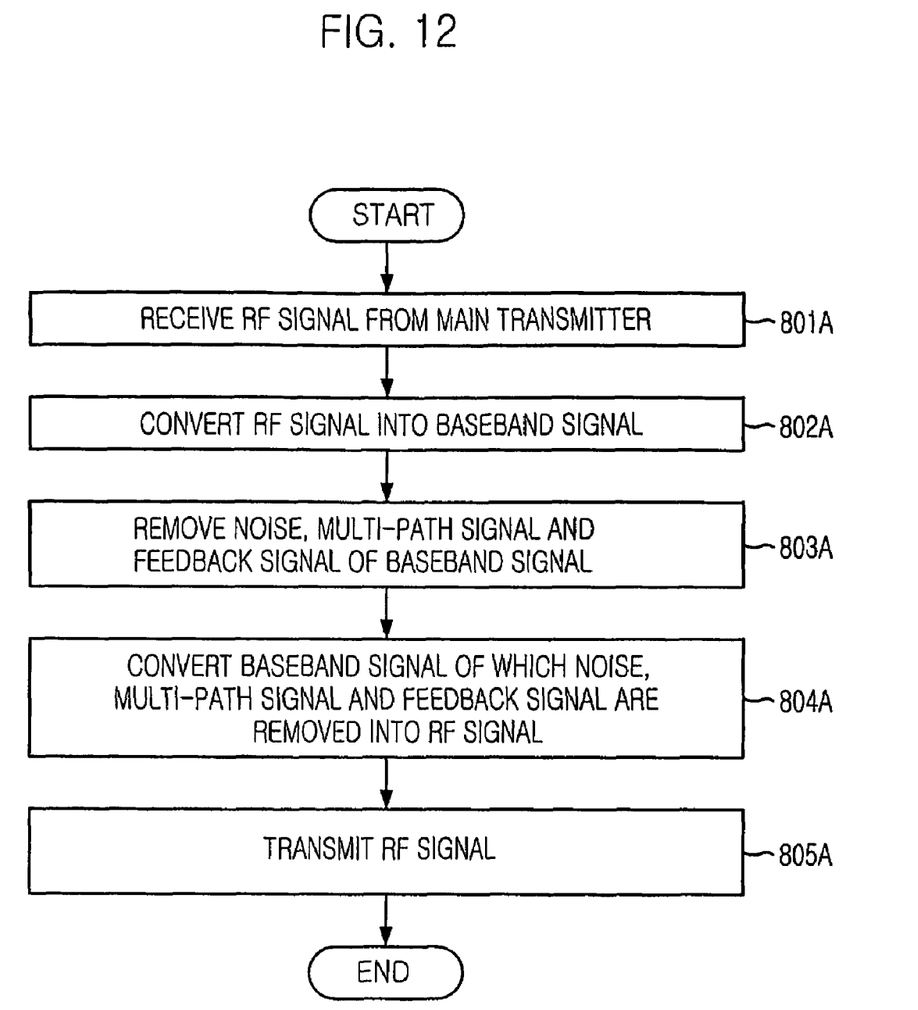
FIG. 12 is a flow chart illustrating a repeating method of an on-channel repeater in accordance with a preferred embodiment of the present invention.

FIG. 12 is a flow chart illustrating a repeating method of an on-channel repeater in FIG. 7 in accordance with a preferred embodiment of the present invention.

An RF signal from a main transmitter is received at step 801A, the RF signal is converted into a baseband signal at step 802A.

The noise and multi-path signals generated between the main transmitter and the on-channel repeater and a feedback signal generated due to the low isolation of the reception/transmission antennas of the on-channel repeater are removed from the baseband signal at step 803A. The baseband signal of which the noise, the multi-path signal and the feedback signal are removed is converted into an RF signal and transmitted at steps 804A and 805A.

Figure 8:
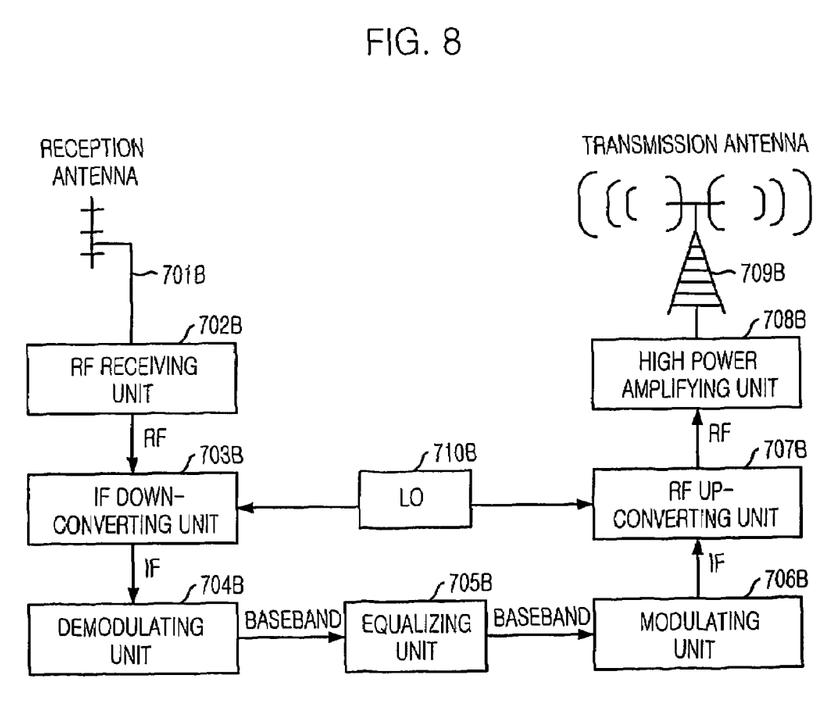
FIG. 8 is a diagram illustrating an on-channel repeater in accordance with another preferred embodiment of the present invention.

FIG. 8 is a diagram an on-channel repeater in accordance with another preferred embodiment of the present invention.

As shown, the on-channel repeater includes a reception antenna 701B, a RF receiving unit 702B, an IF down-converting unit 703B, a demodulating unit 704B, an equalizing unit 705B, a modulating unit 706B, a RF up-converting unit 707B, a high power amplifying unit 708B, a transmission antenna 709B and a local oscillator (LO) 710B.

The RF receiving unit 702B receives a radio frequency (RF) broadcast signal from a main transmitter through a reception antenna 701B. The IF down-converting unit 703B converts the received RF broadcast signal into an intermediate frequency (IF) signal based on a first reference frequency. The demodulating unit 704B converts the IF signal into a baseband signal. The equalizing unit 705B equalizes the baseband signal and compensates distortion on the transmission channel. The modulating unit 706B converts the baseband signal outputted from the equalizing unit 705B into an IF signal. The RF up-converting unit 707B converts the converted IF signal into a RF broadcast signal based on a second reference frequency. The high power amplifying unit 708B amplifies and repeats the converted RF broadcast signal. The transmission antenna 709B transmits the broadcast signal outputted from the high power amplifying unit 708B. The local oscillator (LO) 710B generates the first reference frequency and the second reference frequency, and provides the first reference frequency to the IF down-converting unit 703B, and the second reference frequency to the RF up-converting unit 707B.

Figure 13:
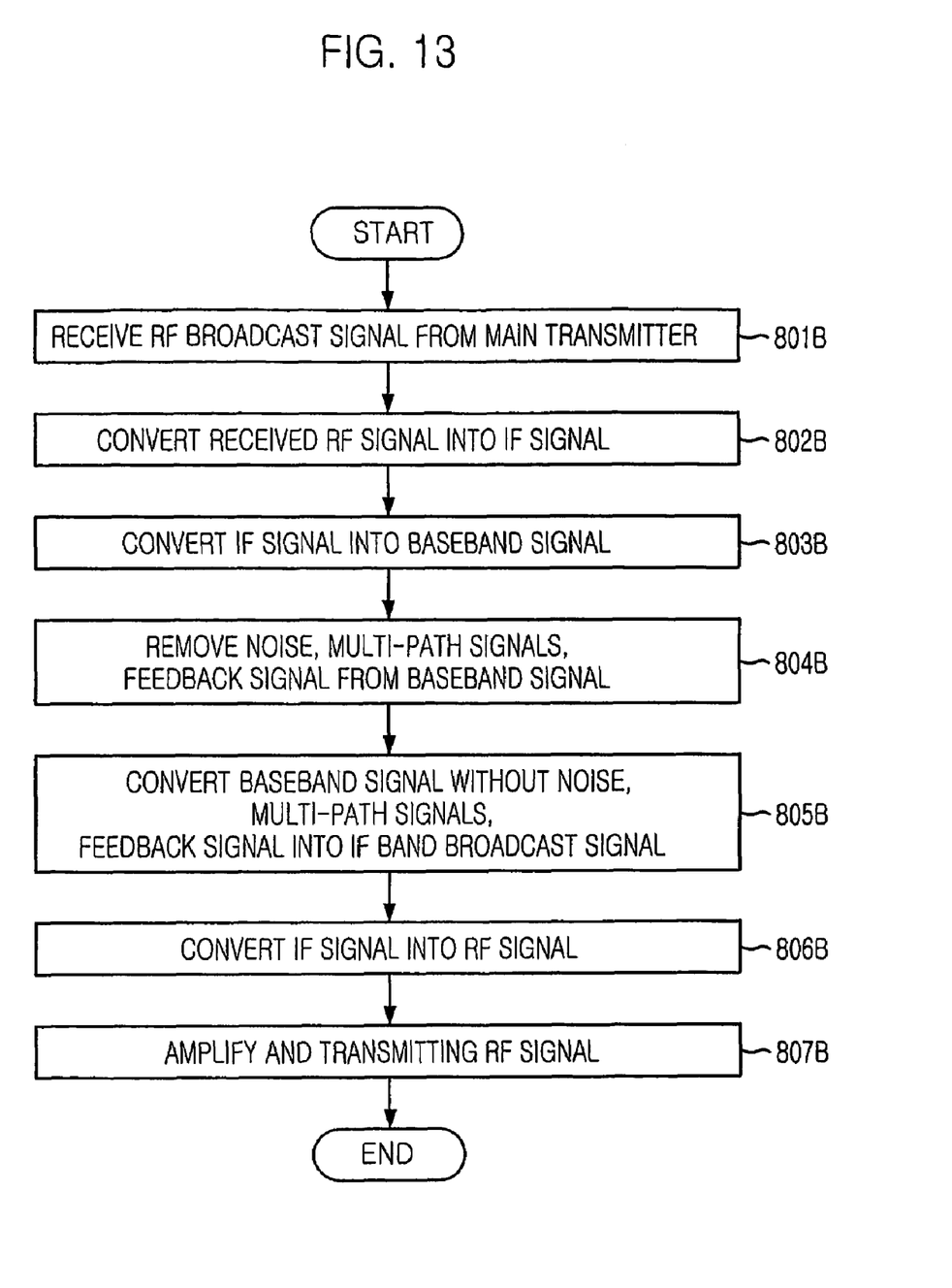
FIG. 13 is a flow chart illustrating a repeating method of an on-channel repeater in accordance with another preferred embodiment of the present invention.

FIG. 13 is a flow chart illustrating a repeating method of the on-channel repeater of FIG. 8 in accordance with a preferred embodiment of the present invention.

As shown in FIG. 13, in the repeating method of the on-channel repeater in accordance with the present invention, the RF broadcast signal is received from the main transmitter at step 801B, and the received RF broadcast signal is converted into the. IF signal at step 802B.

Next, the IF signal is converted into the baseband signal at step 803B, and the noise and multi-path signals generated due to the transmission channel between the main transmitter and the on-channel repeater and the feedback signal generated due to the low isolation of the transmission/reception antennas are removed from the baseband signal at step 804B.

And then, the baseband signal without the noise and multi-path signals and the feedback signal is converted into an IF band broadcast signal at step 805B, and the IF signal is converted into the RF signal at step 806B. The RF signal is amplified and transmitted at step 807B.

Figure 9:
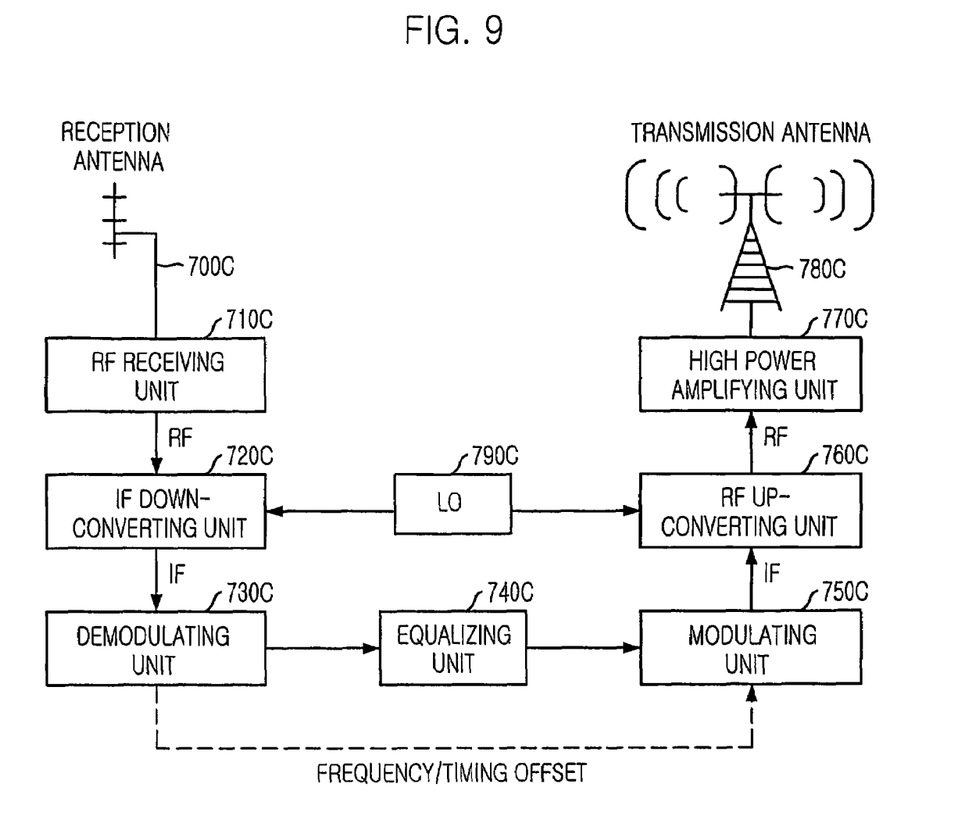
FIG. 9 is a diagram illustrating an on-channel repeater in accordance with another preferred embodiment of the present invention.

FIG. 9 is a diagram an on-channel repeater in accordance with another preferred embodiment of the present invention.

As shown, the on-channel repeater includes a reception antenna 700C, a RF receiving unit 710C, an IF down-converting unit 720C, a demodulating unit 730C, an equalizing unit 740C, a modulating unit 750C, a RF up-converting unit 760C, a high power amplifying unit 770C, a transmission antenna 780C and a local oscillator (LO) 790C;

The RF receiving unit 710C receives a RF (Radio Frequency) broadcast signal from a main transmitter through a reception antenna 700C. The IF down-converting unit 720C converts the received RF broadcast signal into an intermediate frequency (IF) signal based on a first reference frequency. The demodulating unit 730C converts the IF signal into a baseband signal.

The equalizing unit 740C equalizes the converted baseband signal to generate an equalized baseband signal. The modulating unit 750B converts the equalized baseband signal outputted from the equalizing unit 740C into an IF signal. The RF up-converting unit 760C converts the IF signal into a RF broadcast signal based on a second reference frequency. The high power amplifying unit 770C amplifies and repeats the converted RF broadcast signal. The transmission antenna 780C transmits the RF broadcast signal outputted from the high power amplifying unit 770C.

The local oscillator (LO) 790C generates the first reference frequency and the second reference frequency, and provides the first reference frequency to the IF down-converting unit 720C, and the second reference frequency to the RF up-converting unit 760C.

Figure 14:
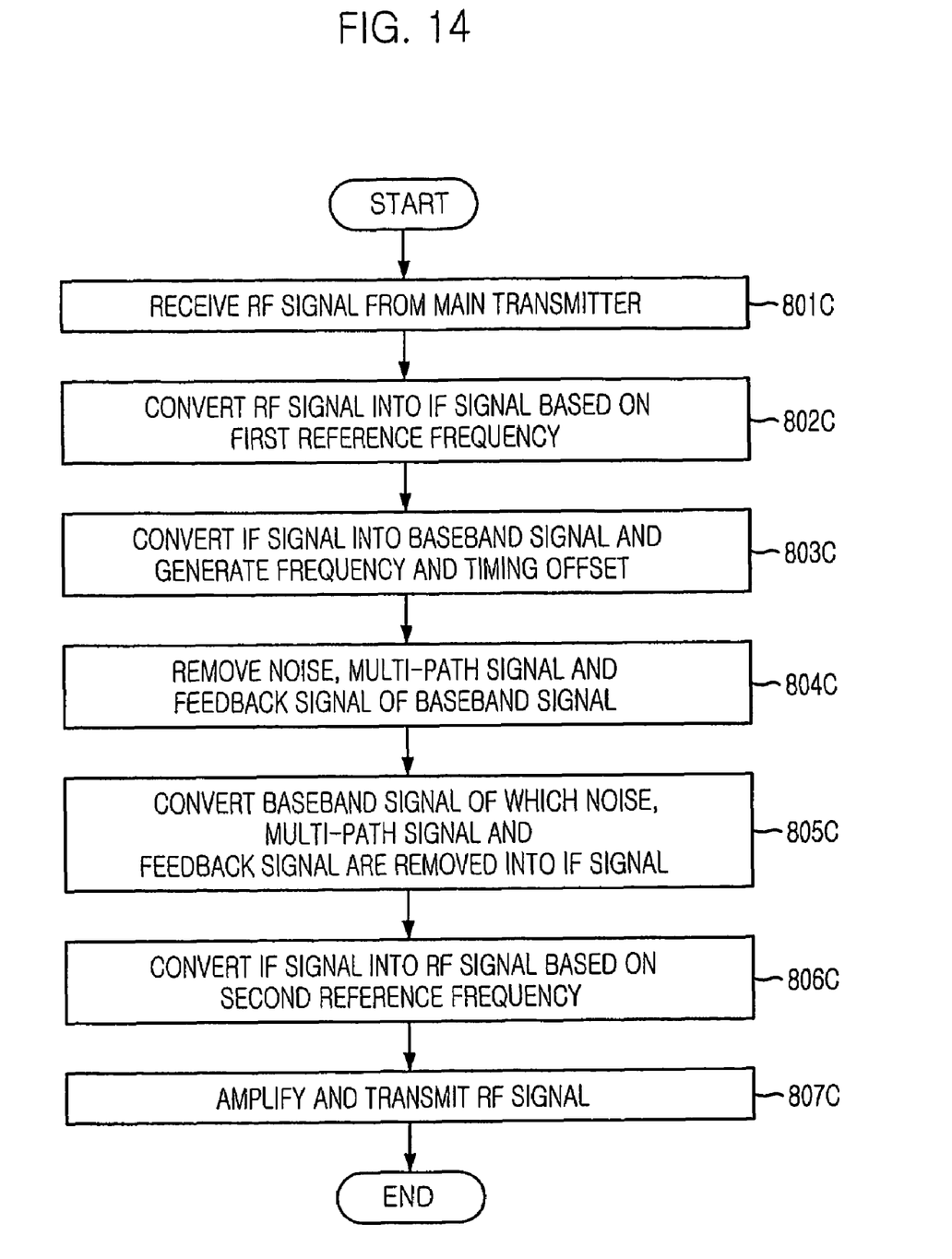
FIG. 14 is a flow chart illustrating a repeating method of an on-channel repeater in accordance with another preferred embodiment of the present invention.

FIG. 14 is a flow chart illustrating a repeating method of the on-channel repeater in FIG. 9 in accordance with a preferred embodiment of the present invention.

The RF receiving unit 710C receives the RF broadcast signal from the main transmitter through the reception antenna 700C at step 801C, and the IF down-converting unit 720C converts the RF broadcast signal into the IF signal based on a first reference frequency provided from the local oscillator 790C at step 802C.

Next, the demodulating unit 730C demodulates the IF signal to generate a baseband signal, extracts the carrier frequency and the sampling timing error to be provided to the modulating unit 750C at step 803C. The equalizing unit 740C equalizes the baseband signal, compensates signal distortion generated in the transmission channel, and removes the feedback signal due to the low isolation of the transmission/reception antennas of the on-channel repeater, to thereby generate an equalized baseband signal at step 804C.

The modulating unit 750C modulates the equalized baseband signal based on the carrier frequency and the timing offset to generate an IF signal at step 805C, and the RF up-converting unit 760C converts the IF signal into the RF signal based on the second reference frequency provided from the local oscillator 790C at step 806C.

The RF signal is amplified by the high power amplifying unit 770C and transmitted by the transmission antenna at step 807C.

A frequency and a phase of the signal received from the main transmitter should be synchronized with those of the signal to be transmitted through the transmission antenna 780C of the on-channel repeater.

A method for synchronizing the frequency and the phase with the signals will be described as follows.

The RF signal received from the main transmitter through the RF receiving unit 710C is converted to an IF signal by the IF down-converting unit 720C based on the first reference frequency provided from the local oscillator 790C, and converted to a baseband signal by the demodulating unit 730C.

The demodulating unit 730C having a carrier restoring unit extracts the carrier frequency and the sampling timing error, to thereby generate the carrier frequency and the sampling timing offset of the RF signal.

The modulating unit 750C converts the baseband signal to an IF signal based on the carrier frequency and the sampling timing error, so that the IF signal is generated regarding the error of the RF signal received from the main transmitter.

The IF signal modulated based on the carrier frequency and the timing error is converted to an RF signal by the RF up-converting unit 760C based on the second reference frequency provided from the LO 790C and transmitted.

As described above, since the transmission signal to be transmitted from the on-channel repeater is modulated based on the frequency and timing error, the frequency and the phase of the output signal of the on-channel repeater can be allowed to be frequency-and-phase synchronized with those of the signal generated from the main transmitter even without a separate reference signal.

Figure 10:
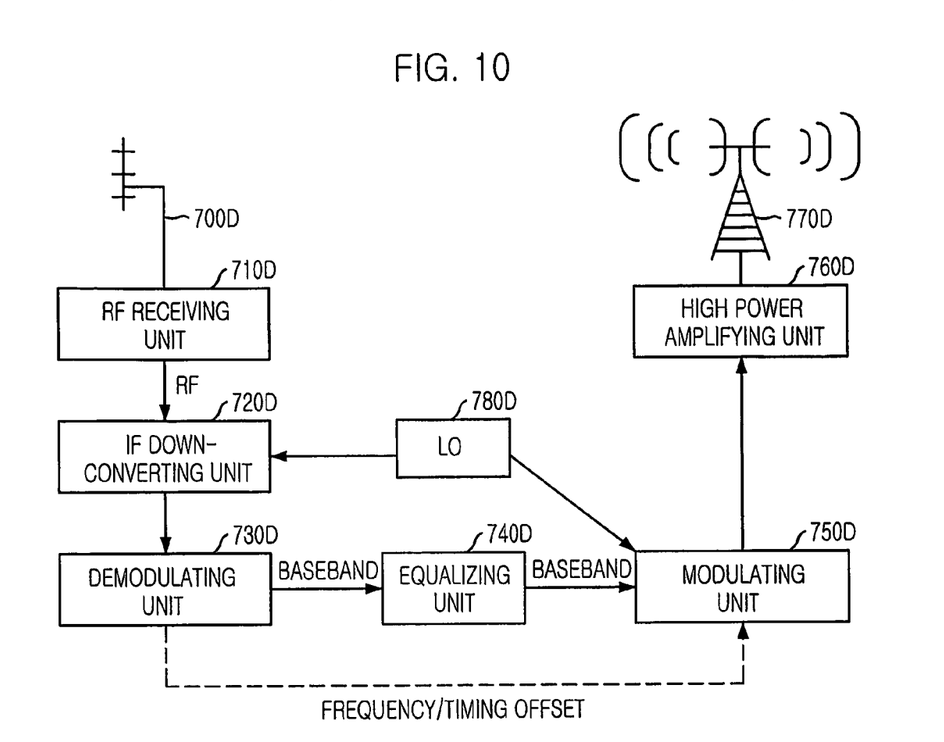
FIG. 10 is a diagram illustrating an on-channel repeater in accordance with another preferred embodiment of the present invention.

FIG. 10 is a diagram illustrating an on-channel repeater in accordance with another preferred embodiment of the present invention.

As shown, the on-channel repeater includes a reception antenna 700D, a RF receiving unit 710D, an IF down-converting unit 720D, a demodulating unit 730D, an equalizing unit 740D, a modulating unit 750D, a high power amplifying unit 760D, a transmission antenna 770D and a local oscillator (LO) 780D.

The RF receiving unit 710D receives a RF (Radio Frequency) broadcast signal from a main transmitter through a reception antenna 700D. The IF down-converting unit 720D converts the received RF broadcast signal into an intermediate frequency (IF) signal based on a first reference frequency. The demodulating unit 730D converts the IF signal into a baseband signal, extracts a carrier frequency and a sampling timing error and generates frequency and timing offset to be provided to the modulating unit 750D.

The equalizing unit 740D equalizes the baseband signal to generate an equalized baseband signal. The modulating unit 750D converts the equalized baseband signal outputted from the equalizing unit 740D into an RF signal. The high power amplifying unit 760D amplifies and repeats the converted RF broadcast signal. The transmission antenna 770D transmits the broadcast signal outputted from the high power amplifying unit 760D.

The local oscillator (LO) 780D generates the first reference frequency and the second reference frequency, and provides the first reference frequency to the IF down-converting unit 720D, and the second reference frequency to the modulating unit 750D.

Figure 15:
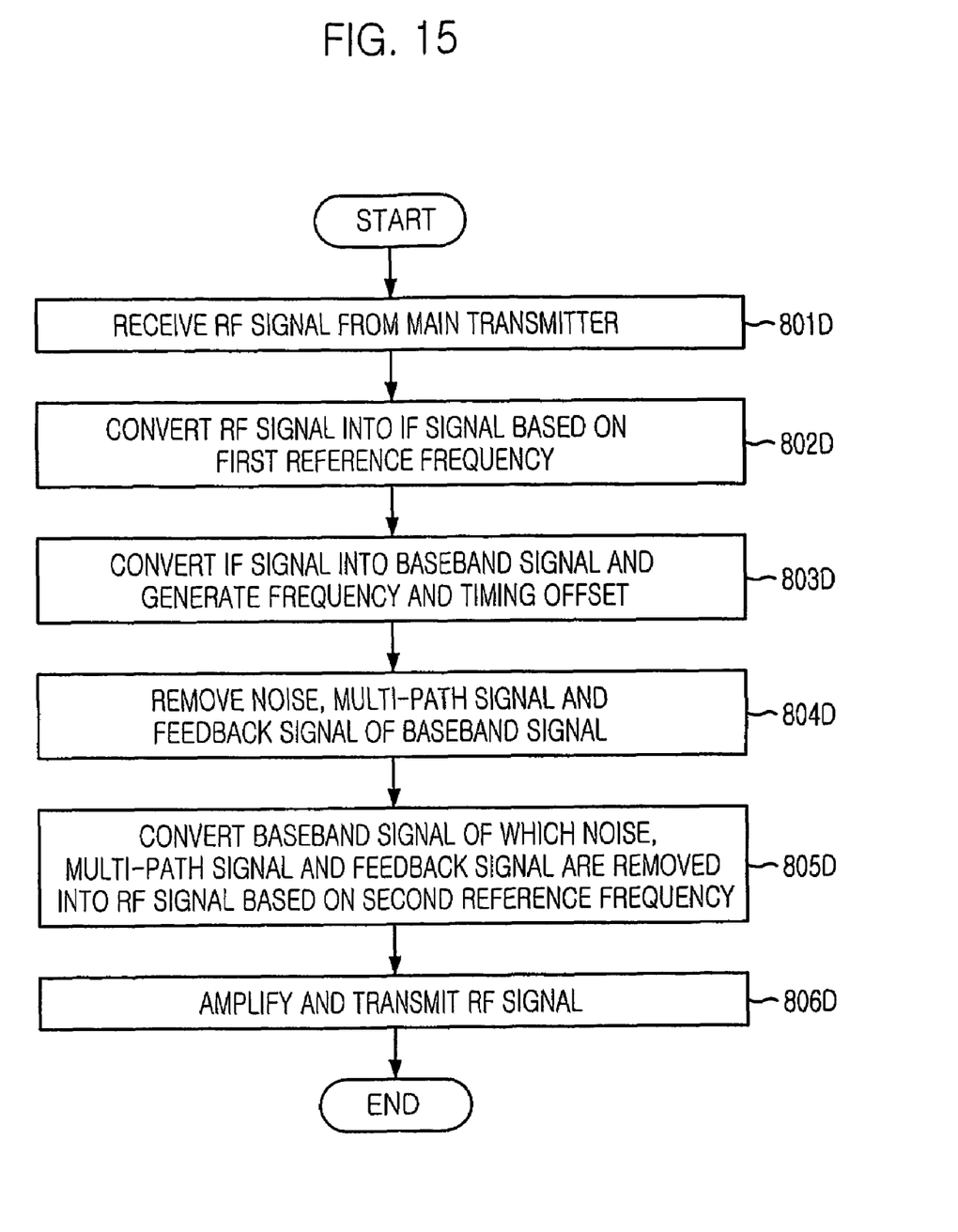
FIG. 15 is a flow chart illustrating a repeating method of an on-channel repeater in accordance with another preferred embodiment of the present invention.

FIG. 15 is a flow chart illustrating a repeating method of the on-channel repeater in FIG. 10 in accordance with a preferred embodiment of the present invention.

The RF receiving unit 710D receives the RF broadcast signal from the main transmitter through the reception antenna 700D at step 801D, and the IF down-converting unit 720D converts the RF broadcast signal into the IF signal based on a first reference frequency provided from the local oscillator 780D at step 802D.

Next, the demodulating unit 730D demodulates the IF signal to generate a baseband signal, extracts the carrier frequency and the sampling timing error to be provided to the modulating unit 750D at step 803D. The equalizing unit 740D equalizes the baseband signal, compensates signal distortion generated in the transmission channel, and removes the feedback signal due to the low isolation of the transmission/reception antennas of the on-channel repeater, to thereby generate an equalized baseband signal at step 804D.

The modulating unit 750D modulates the equalized baseband signal based on the carrier frequency and the timing offset to generate an RF signal based on the second reference frequency provided from the local oscillator 780D at step 805D.

The RF signal is amplified by the high power amplifying unit 760D and transmitted by the transmission antenna at step at step 806D.

A method for synchronizing a frequency and a phase of the signal received from the main transmitter with those of the signal to be transmitted through the transmission antenna 770D of the on-channel repeater is similar to the method described with reference to FIG. 10, which will be described.

The RF signal received from the main transmitter through the RF receiving unit 710D is converted to an IF signal by the IF down-converting unit 720D based on the first reference frequency provided from the local oscillator 780D, and converted to a baseband signal by the demodulating unit 730D.

The demodulating unit 730D having a carrier restoring unit extracts the carrier frequency and the sampling timing error, to thereby generate the carrier frequency and the sampling timing offset of the RF signal.

The modulating unit 750D converts the baseband signal to an RF signal based on the carrier frequency, the sampling timing error and the second reference frequency provided from the LO 780D.

Figure 11:
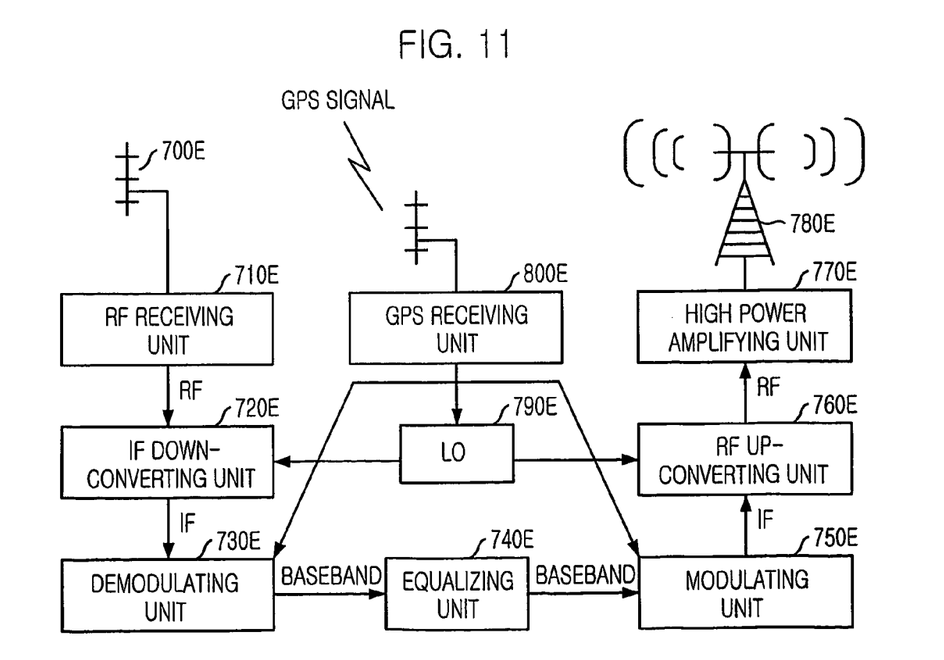
FIG. 11 is a diagram illustrating an on-channel repeater in accordance with another preferred embodiment of the present invention.

FIG. 11 is a diagram illustrating an on-channel repeater in accordance with another preferred embodiment of the present invention. The on-channel repeater synchronizes a frequency of a received signal with that of a transmission signal based on a global positioning system (GPS) signal. Elements of the on-channel repeater are similar to the on-channel repeaters in FIGS. 8 and 9 except for a GPS receiving unit 800E.

The GPS receiving unit 800E divides a GPS reference signal and provides divided GPS reference signals to an analog-to-digital converter of a demodulating unit 730E and a digital-to-analog converter of a modulating unit 750E. Also, the GPS receiving unit 800E provides the divided GPS reference signal to a local oscillator (LO) 790E, the LO 790E provides a reference frequency to an IF down-converting unit 720E and an RF up-converting unit 760E.

The main transmitter receives the same GPS reference signal as the GPS reference signal received by the on-channel repeater, converts the digital broadcast signal to the analog broadcast signal and the converted analog broadcast signal to the RF broadcast signal based on the GPS reference signal.

Therefore, a frequency of the signal received from the main transmitter is identical to that of the signal to be transmitted through the transmission antenna 780E of the on-channel repeater. However, the GPS receiving unit should be additionally mounted on the on-channel repeater and the main transmitter.

In the on-channel repeater in accordance with the present invention the output signal has better characteristics than that of the input signal since the noise and multi-path signals generated due to the transmission channel between the main transmitter and the on-channel repeater are removed using the high performance equalizer. Further, the invented on-channel repeater has an increased transmission power since the feedback signal generated due to the low isolation of the transmission/reception antennas can be removed at the equalizer. Additionally, the invented on-channel repeater has a relative low system delay.

Therefore, using the above on-channel repeater, the received signal is identical to the transmission signal, and time delay between the received signal and the transmission signal is small. The transmission signal has better characteristics than the received signal, because the noise and multi-path signals generated due to the transmission channel between the main transmitter and the on-channel repeater are removed. Further, the on-channel repeater has an increased transmission power, since the feedback signal generated due to the low isolation of the transmission/reception antennas can be removed at the equalizer.

Figure 16:
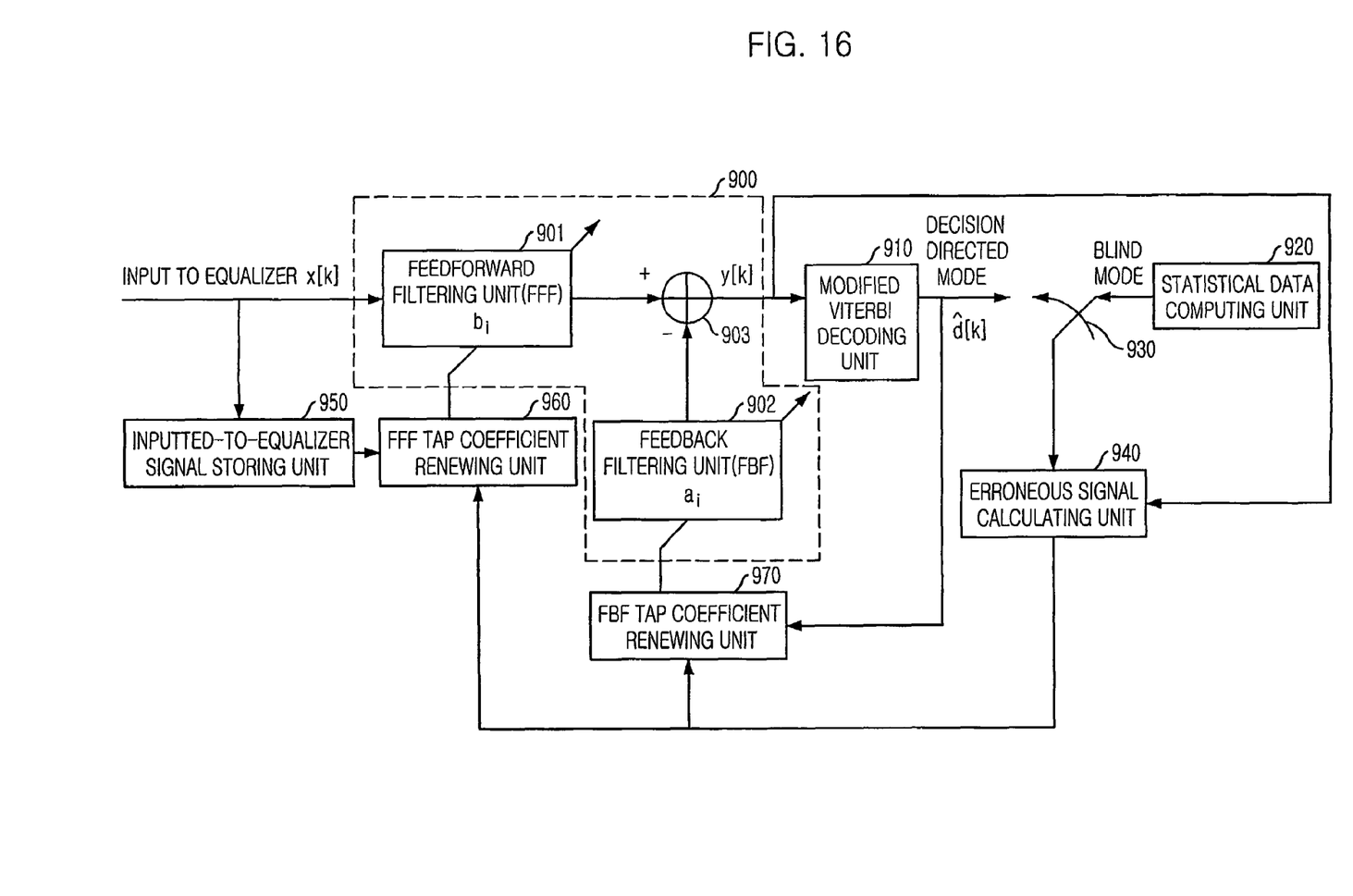
FIG. 16 is a view illustrating a construction of an equalizing unit of an on-channel repeater in accordance with a preferred embodiment of the present invention.

FIG. 16 is an exemplary view illustrating a construction of the equalizing unit of the on-channel repeater in accordance with a preferred embodiment of the present invention. In the present invention, it is not limited to the equalizing unit illustrated in FIG. 16. In other words, various equalizing units, e.g., a Viterbi decoder, a soft output Viterbi Algorithm (SOVA) decoder, a slicer can be used for the on-channel repeater in accordance with the present invention.

Referring to FIG. 16, the equalizing unit of the on-channel repeater in accordance with the present invention includes a main filtering unit 900, a modified viterbi decoder 910, a statistical data computing unit 920, a switching unit 930, an error signal calculating unit 940, an input-to-equalizer signal storing unit 950, a Feed Forward Filtering (FFF) tap coefficient renewing unit 960 and a Feed Backward Filtering (FBF) tap coefficient renewing unit 970.

The main filtering unit 900 performs channel equalization by repetitively filtering the signal input or applied from the demodulating unit.

The modified viterbi decoder 910 detects a symbol from a digital broadcast signal received from the main filtering unit 900 by using a modified viterbi decoding algorithm with a Trace Back Depth TBD of 1 being to reduce complexity.

The statistical data computing unit 920 computes necessary statistical data in a blind mode.

The switching unit 930 selects an output signal in a decision directed mode or a blind mode.

The error signal calculating unit 940 compares an output signal y[k] of the main filtering unit 900 with an output signal d̂[k] of the modified viterbi decoder 910 or an output signal of the statistical data computing unit 920 to calculate an error signal e[k].

The input-to-equalizer signal storing unit 950 stores a signal input from the demodulating unit.

The Feed Forward Filtering FFF tap coefficient renewing unit 960 renews a tap coefficient $b_1$ applied to the Feed Forward Filtering unit FFF 901 by using the output signal of the input-to-equalizer signal storing unit 950 and the calculated error signal e[k].

The FBF tap coefficient renewing unit 970 renews the tap coefficient $a_1$ applied to the feedback filtering unit FBF 902 by using the output signal d̂[k] of the modified viterbi decoder 910 and the calculated error signal e[k].

Hereinafter, operations of the equalizing unit are explained in detail.

First, the main filtering unit 900 performs the channel equalization by repetitively filtering the signal input or applied from an external (demodulating unit), and the modified viterbi decoder 910 detects the symbol from the digital broadcast signal received from the main filtering unit 900 by using the modified viterbi decoding algorithm with the TBD being one and the complexity being reduced.

The statistical data computing unit 920 computes the necessary statistical data in the blind mode, and the switching unit 930 selects the output signal in the decision directed mode or the blind mode.

The error signal calculating unit 940 compares the output signal y[k] of the main filtering unit 900 with the output signal d̂[k] of the modified viterbi decoder 910 or the output signal of the statistical data computing unit 920 to calculate the error signal e[k].

The FFF tap coefficient renewing unit 960 renews the tap coefficient $b_1$ applied to the Feed Forward Filtering unit (FFF) 901 by using the output signal of the input-to-equalizer signal storing unit 950 and the calculated error signal e[k], and the FBF tap coefficient renewing unit 970 renews the tap coefficient $a_1$ applied to the feedback filtering unit (FBF) 902 by using the output signal d̂[k] of the modified viterbi decoder 910 and the calculated error signal e[k].

Further, in order to remove the noise signal generated due to the transmission channel between the main transmitter and the on-channel repeater, the training sequence is used as a output signal of the equalizer at a data duration having the training sequence, and the output signal of the symbol detector is used as a output signal of the equalizer at a data duration not including the training sequence.

The equalizer used in the present invention is not limited to a certain type and may be selected based on characteristics of the transmission method and the on-channel repeating network. However, if an equalizer having a better performance is used, the performance of the on-channel repeater is better. The on-channel repeater and method thereof is appropriate for DTV broadcasting, e.g., ATSC and DVB. However, the on-channel repeater and method thereof is not limited to the DTV broadcasting, and can be applied to a repeater necessary for a single frequency network.

Accordingly, the above on-channel repeater allows the output signal therefrom to be the same as the output signal of the main transmitter, allows the low time-delaying of the two output signals, allows the noise and multi-path signals generated due to the transmission channel between the main transmitter and the on-channel repeater to be removed to have better output signal characteristics than the input signal characteristic, and allows the feedback signal generated due to the low isolation of the transmission/reception antennas to be removed therefrom to increase the transmission output power thereof.

As described above, the present invention has an effect that a usage efficiency of a limited frequency resource can be increased since the digital TV broadcasting service can be repeated through the on-channel repeater.

While the present invention has been described with respect to the particular embodiments, it will be apparent to those skilled in the art that various changes and modifications may be made without departing from the scope of the invention as defined in the following claims.

What is claimed is:

1. An on-channel repeater which receives a signal on one channel and distributes the signal on the same channel, the on-channel repeating apparatus comprising:
   a receiving means for receiving a Radio Frequency (RF) broadcast signal transmitted from outside;
   a demodulating means for demodulating the RF signal received by the receiving means into a baseband signal, and for extracting a carrier frequency and a sampling timing offset;
   an equalizing means for equalizing the baseband signal obtained from the demodulation in the demodulating means to obtain a baseband output signal;
   a modulating means for modulating the baseband output signal from the equalizing means into an RF signal based on the carrier frequency and the sampling timing offset; and
   a transmitting means for transmitting the RF signal obtained from the modulation in modulating means.

2. The on-channel repeater as recited in claim 1, wherein the demodulating means includes:
   an intermediate frequency (IF) down-converting unit for down-converting the received RF signal into an IF signal; and
   a demodulating unit for demodulating the IF signal obtained from the frequency down-conversion into a baseband signal.

3. The on-channel repeater as recited in claim 1, wherein the modulating means includes:
   a modulating unit for modulating the baseband output signal outputted from the equalizing means into an IF signal; and
   an RF up-converting unit for up-converting the IF signal into an RF signal.

4. An on-channel repeating method for receiving the signal on one channel and distributing the signal on the same channel, the on-channel repeating method comprising the steps of:
   a) receiving a Radio Frequency (RF) signal transmitted from outside;
   b) demodulating the RE signal into a baseband signal and extracting a carrier frequency and a sampling time offset;
   c) equalizing the baseband signal to obtain a baseband output signal;
   d) modulating the baseband output signal into an RF signal based on the carrier frequency and on the sampling time offset; and
   e) transmitting the RF signal obtained from the modulation, wherein the modulation and demodulation at the steps b) and d) are carried out based on a reference frequency signal provided by a local oscillator.

5. The method as recited in claim 4, wherein the step b) includes:
   b1) down-converting the received RF signal into an intermediate frequency (IF) signal; and
   b2) demodulating the IF signal obtained from the frequency down-conversion into a base band signal.

6. The method as recited in claim 4, wherein the step d) includes:
   d1) modulating the baseband output signal outputted from the equalization in the equalizing means into an IF signal; and
   d2) up-converting the IF signal into an RF signal.

7. The on-channel repeater as recited in claim 1, further comprising:
   a local oscillating means for providing a reference frequency signal to the demodulating means and the modulating means.

8. An on-channel repeater which receives a signal on one channel and distributes the signal on the same channel, the on-channel repeating apparatus comprising:
   a RF receiving means for receiving a Radio Frequency (RF) broadcast signal having a first reference frequency;
   p1 an IF down-converting means for converting the received RF broadcast signal into an Intermediate Frequency (IF) signal based on a first reference freguency signal;
   a local oscillating means for providing the first reference frequency signal to the IF down-converting means and for providing a second reference frequency signal to a modulating means;
   the demodulating means for demodulating the IF signal into a baseband signal and for extracting a carrier freguency and a sampling time error;
   an equalizing means for equalizing the baseband signal obtained from the demodulation in the demodulating means to obtain a baseband output signal;
   the modulating means for modulating the baseband output signal from the equalizing means into an RF signal based on the carrier frequency and on the sampling timing offset to generate an IF signal and for converting the IF signal into the RF signal based on the second reference frequency; and
   a transmitting means for transmitting the RF signal obtained from the modulating means.

9. The on-channel repeater as recited in claim 7, further comprising: a Global Positioning System (GPS) receiving means for receiving a GPS reference signal to synchronize frequency of the transmitting signal with frequency of received signal and dividing the GPS reference signal for the demodulating means, the modulating means, and the local oscillating means.

10. The on-channel repeater as recited in claim 1, wherein the demodulating means includes:
    an IF down-converting unit for down-converting the received RF signal into an IF signal; and
    a demodulating unit for demodulating the IF signal obtained from the frequency down-conversion into a baseband signal, and the modulating means includes:
    a modulating unit for modulating the baseband output signal outputted from the equalizing means into an IF signal; and
    an RF up-converting unit for up-converting the IF signal into an RF signal.

11. The on-channel repeater as recited in claim 10, further comprising a local oscillator for providing a reference frequency signal to the IF down-converting unit and the RE up-converting unit.

12. The on-channel repeater as recited in claim 11, wherein the local oscillator provides a first reference frequency to the demodulator and provides a second reference frequency to the modulating unit.

13. The on-channel repeater as recited in claim 11, further comprising:
    a GPS receiving means for receiving a GPS reference signal to synchronize frequency of the transmitting signal with frequency of received signal and dividing the GPS reference signal for the demodulating unit, the modulating unit and the local oscillator.

14. The method as recited in claim 4, wherein local oscillator provides a first reference frequency to the demodulator and provides a second reference frequency to the modulating unit.

15. The method as recited in claim 14, wherein wherein the demodulator includes an IF downconverting unit.

16. The method as recited in claim 14, further comprising a step of:
   f) generating an oscillation signal needed for the demodulation and modulation at the steps b) and d) by dividing a Global Positioning System (GPS) reference signal received in a GPS receiver.

17. The method as recited in claim 4, wherein the step b) includes:
   b1) down-converting the received RE signal into an IF signal; and
   b2) demodulating the IF signal obtained from the frequency down-conversion into a baseband signal, and the step d) includes:
   d1) modulating the baseband output signal outputted from the equalization in the equalizing means into an IF signal; and
   d2) up-converting the IF signal into an RF signal.

18. The method as recited in claim 17, wherein the frequency down-conversion at the step b1) is performed based on a first reference frequency signal provided by local oscillator, and the frequency up-conversion at the step d2) is carried out based on a second reference frequency signal provided by the local oscillator.

19. The method as recited in claim 18, wherein the a carrier frequency and a sampling time offset are extracted from the IF signals obtained from the frequency down-conversion at the step b), and the baseband output signal is modulated into an IF signal at the step d) based on the carrier frequency and the sampling time offset.

20. The method as recited in claim 18, further comprising a step of:
   g) generating an oscillation signal needed for modulation/demodulation and IF/RF frequency conversion by dividing the GPS reference signal received in the GPS receiver.

* * * * *